US010565202B2

(12) United States Patent
Dong et al.

(10) Patent No.: US 10,565,202 B2
(45) Date of Patent: Feb. 18, 2020

(54) DATA WRITE/IMPORT PERFORMANCE IN A DATABASE THROUGH DISTRIBUTED MEMORY

(71) Applicant: International Business Machines Corporation, Armonk, NY (US)

(72) Inventors: Jin Dong, Beijing (CN); Liang Liu, Beijing (CN); Junmei Qu, Beijing (CN); Tao Tong, Beijing (CN); Wei Zhuang, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 355 days.

(21) Appl. No.: 15/427,141

(22) Filed: Feb. 8, 2017

(65) Prior Publication Data
US 2018/0225333 A1    Aug. 9, 2018

(51) Int. Cl.
*G06F 16/2455* (2019.01)
*G06F 16/25* (2019.01)

(52) U.S. Cl.
CPC ...... *G06F 16/24554* (2019.01); *G06F 16/258* (2019.01)

(58) Field of Classification Search
CPC ... G06F 16/22; G06F 16/258; G06F 16/24554
See application file for complete search history.

(56) References Cited

U.S. PATENT DOCUMENTS 6,349,310 B1 * 2/2002 Klein ................. G06F 16/2282
                                                       707/703
6,665,684 B2 * 12/2003 Zait ..................... G06F 16/2264
7,631,010 B2 * 12/2009 Bailey ................. G06F 16/2343
(Continued)

FOREIGN PATENT DOCUMENTS

CN      104077420 A      10/2014
CN      105069149 A      11/2015

OTHER PUBLICATIONS

Valla, Rohit Reddy; "A Case Study on Apache HBase"; A Master's Project Presented to Department of Computer and Information Sciences SUNY Polytechnic Institute Utica, New York, May 2015; 1-66 pages.

*Primary Examiner* — Miranda Le
(74) *Attorney, Agent, or Firm* — Cantor Colburn LLP; Joseph Petrokaitis

(57) ABSTRACT

Aspects of the present invention include a method, which includes updating, by a processor, one or more distributed memory datasets having data stored therein in response to a write data operation, the one or more distributed data memory datasets being located in a database. The method further includes splitting, by the processor, any one of the one or more distributed memory datasets into two distributed memory datasets when a size of the any one of the one or more distributed memory datasets exceeds a threshold value. The method further includes moving, by the processor, the stored data in any one of the one or more distributed memory datasets to regions within the database upon an occurrence of one or more conditions with respect to the one or more distributed memory datasets. Other aspects of the present invention include a system and a computer program product.

12 Claims, 8 Drawing Sheets

(56) References Cited

U.S. PATENT DOCUMENTS

| | | | |
|---|---|---|---|
| 7,899,844 B2* | 3/2011 | Predovic | G06F 16/284 707/802 |
| 8,078,636 B2* | 12/2011 | Layden | G06F 16/289 707/791 |
| 8,078,825 B2* | 12/2011 | Oreland | G06F 16/2255 711/173 |
| 8,176,284 B2* | 5/2012 | Frost | G06F 11/1044 711/165 |
| 8,180,991 B2* | 5/2012 | Ravindranath | G06F 9/5016 707/736 |
| 8,341,181 B2* | 12/2012 | Lintum | G06F 16/217 707/790 |
| 9,003,162 B2* | 4/2015 | Lomet | G06F 12/10 711/206 |
| 9,009,439 B2* | 4/2015 | Schreter | G06F 3/0674 711/171 |
| 9,128,949 B2* | 9/2015 | Lipcon | G06F 3/0611 |
| 9,276,879 B2* | 3/2016 | An | H04L 69/22 |
| 9,552,162 B2* | 1/2017 | Effern | G06F 3/0608 |
| 9,558,221 B2* | 1/2017 | Hu | G06F 16/22 |
| 9,798,487 B2* | 10/2017 | Duluk, Jr. | G06F 12/08 |
| 2003/0084265 A1* | 5/2003 | Heller | G06F 12/023 711/170 |
| 2008/0215816 A1* | 9/2008 | Emma | G06F 12/0848 711/122 |
| 2012/0102067 A1* | 4/2012 | Cahill | G06F 16/27 707/770 |
| 2012/0158650 A1* | 6/2012 | Andre | G06F 16/24539 707/611 |
| 2014/0164431 A1* | 6/2014 | Tolbert | G06F 16/25 707/770 |
| 2014/0188825 A1* | 7/2014 | Muthukkaruppan | G06F 16/134 707/694 |
| 2015/0074115 A1* | 3/2015 | Vasu | G06F 16/27 707/741 |
| 2016/0048778 A1 | 2/2016 | Sharon et al. | |

* cited by examiner

DATA WRITE/IMPORT PERFORMANCE IN A DATABASE THROUGH DISTRIBUTED MEMORY

BACKGROUND

The present invention relates in general to computer databases, and more specifically, to writing or importing data into a database through distributed memory management.

SUMMARY

According to one or more embodiments of the present invention, a computer-implemented method includes updating, by a processor, one or more distributed memory datasets having data stored therein in response to a write data operation, the one or more distributed data memory datasets being located in a database. The method further includes splitting, by the processor, any one of the one or more distributed memory datasets into two distributed memory datasets when a size of the any one of the one or more distributed memory datasets exceeds a threshold value. The method further includes moving, by the processor, the stored data in any one of the one or more distributed memory datasets to regions within the database upon an occurrence of one or more conditions with respect to the one or more distributed memory datasets. Other embodiments of the present invention include a system and a computer program product.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings, in which:

DETAILED DESCRIPTION

Figure 1:
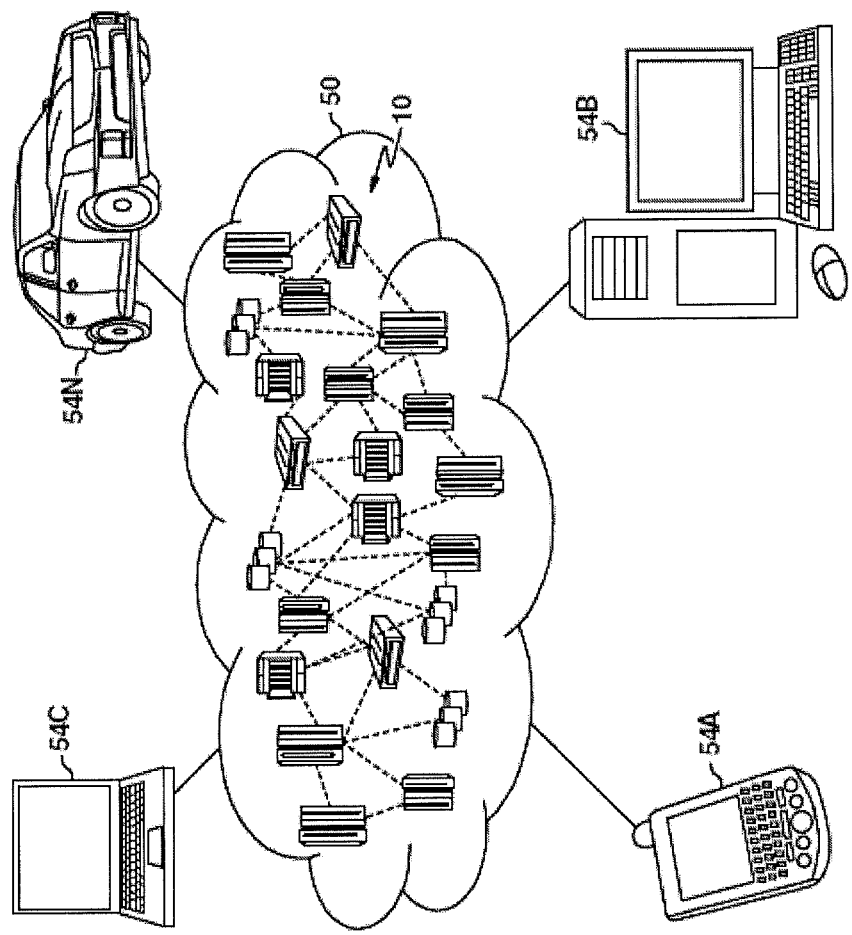
FIG. 1 depicts a cloud computing environment according to one or more embodiments of the present invention.

It is understood in advance that although this detailed description includes a description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

By way of overview, one exemplary database technology in accordance with aspects of the present invention is a non-relational, column-oriented and relatively large distributed database. One (non-limiting) example is a so-called Hbase database ("Hbase"). However, embodiments of the present invention are not limited to an Hbase database. Other types of databases (both non-relational and relational) can be utilized in various other embodiments of the present invention.

An Hbase database is a type of open-source, non-relational, relatively large distributed database that is column-oriented. An Hbase stores data in tables, which can include billions of rows with millions of columns. Each table has a primary key element, and all data read and write operations in Hbase use this primary key element ("RowKey") when accessing the Hbase. Further, each column typically stores or represents an attribute of an object. Hbase allows for a multiple of related attributes or columns to be grouped together into a "column family." This can result in an Hbase database containing a very large number of column families. Hbase also allows for one or more new columns to be easily added to a column family (or removed from a column family) at any time.

A typical use for an Hbase database is for storing important information or data within a much larger collection of empty or relatively unimportant data (sometimes referred to as a "sparse" data set). The Hbase allows for relatively quick random access by, e.g., a processor running an application to access important information or data stored in the Hbase. Such applications are sometimes referred to as "big data"
database applications. Thus, Hbase is well suited for storing unstructured or semi-structured data.

Typically, when data is written or imported into an Hbase, the input data is stored in a write buffer, cache or "region" (sometimes referred to as MemStore), that accumulates data in Hbase memory before it is more permanently written to another portion of Hbase memory. The data is sorted and stored in a distributed manner in MemStore through use of the RowKey. Typically, there is one MemStore per column family. The underlying storage format for an Hbase database is sometimes referred to as an Hfile. A column family can have multiple Hfiles. When the amount of input data in MemStore exceeds a threshold, a flush operation moves or "flushes" out the data in MemStore into disk storage to form an Hfile. A new Hfile is formed on every occurrence of a flush operation. The multiple Hfiles that correspond to a single column family are stored in disk storage in a single "StoreFile" region.

The size (in terms of number of Hfiles) of a single StoreFile region can become increasingly large over time. In some embodiments, when the size of a single StoreFile region exceeds a threshold, a region split operation can be triggered, which splits the single StoreFile region into two separate StoreFile regions. A region split operation can cause a remote procedure call (RPC) handler overload, which can adversely affect the ability to write data into the Hbase database.

If the number of StoreFile regions exceeds a threshold, a compact operation is triggered in which multiple StoreFile regions are merged/compacted into a single StoreFile region. Also, any subsequent attempts to write data to the single StoreFile region will be blocked or prevented for a period of time until the compact operation is complete. This is done to prevent an out-of-memory ("OOM") condition from occurring.

After execution of the compact operation, the write capability is restored. Thereafter, the size of a compacted single StoreFile region can also become increasingly large over time. If the size of the single StoreFile region exceeds a threshold, the aforementioned region split operation is triggered which splits the single StoreFile region into two separate StoreFile regions.

FIG. 1 illustrates an exemplary cloud computing environment 50 in accordance with the present invention. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

We turn now to an exemplary overview of aspects of the present invention for writing or importing data into an Hbase database through improved distributed memory dataset management. In some embodiments of the invention, data records are held in memory and divided or split among distributed memory datasets (DMDs). In some embodiments of the invention, an original DMD is split when the size of the DMD exceeds a certain threshold, by triggering a DMD split module, wherein a middle value of a key in the records is obtained and, based on this value, the split module splits the original DMD. In some embodiments of the invention, flushing the DMD into Hbase occurs when the input data is finished or the memory occupied is over a threshold by utilizing a DMD flush module. In some embodiments of the invention, a unified query layer is utilized to transfer the request to Hbase or distributed memory, and the results obtained are merged with the response to a query.

When writing data into the memory of an Hbase database, in accordance with some embodiments of the present invention, otherwise relatively frequent occurrences of compact and split operations can be avoided and beneficially speed up throughput (e.g., for data write and/or import operations) of an Hbase database. Some usages for such embodiments of the present invention include (without limitation) banking and stock trading applications.

Figure 2:
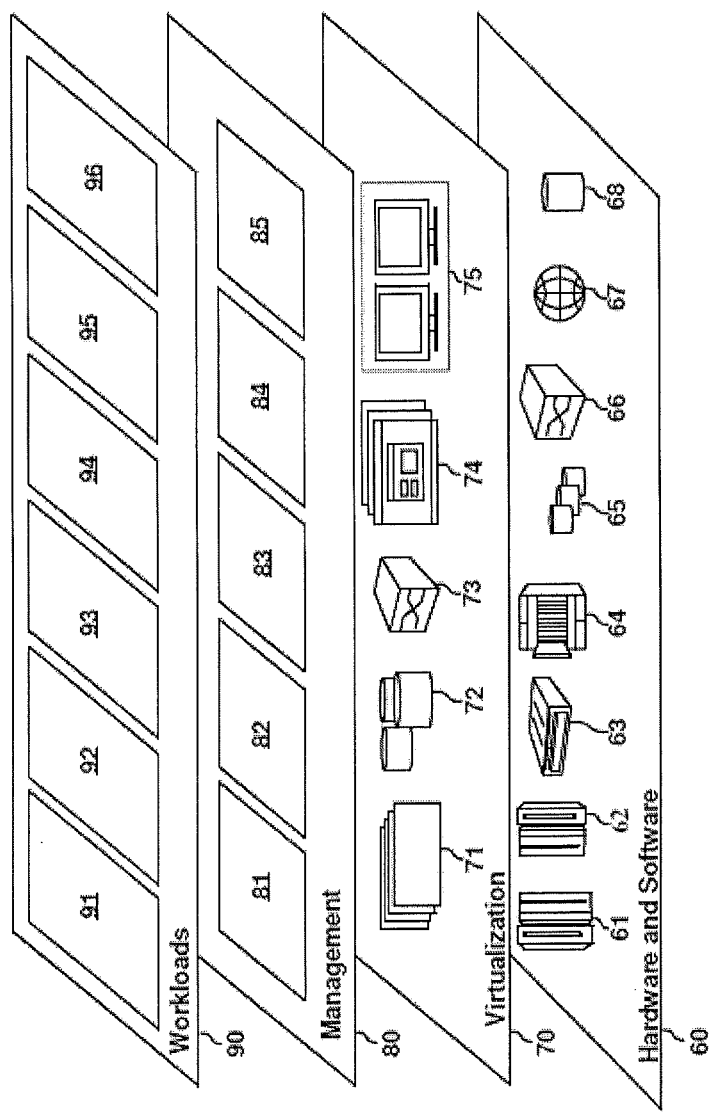
FIG. 2 depicts abstraction model layers according to one or more embodiments of the present invention.

FIG. 2 depicts an exemplary set of functional abstraction layers that can be provided by cloud computing environment 50 (FIG. 1). It should be understood in advance that the components, layers, and functions shown in FIG. 2 are intended to be illustrative only and embodiments of the invention are not limited thereto. As depicted, the following layers and corresponding functions are provided:

As depicted in FIG. 2, hardware and software layer 60 includes hardware and software components. Examples of hardware components include: mainframes 61; RISC (Reduced Instruction Set Computer) architecture based servers 62; servers 63; blade servers 64; storage devices 65 (e.g., database(s) or mass data store(s)); and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and functionality for writing/importing data into a database 96, in accordance with one or more embodiments of the present invention.

Figure 3:
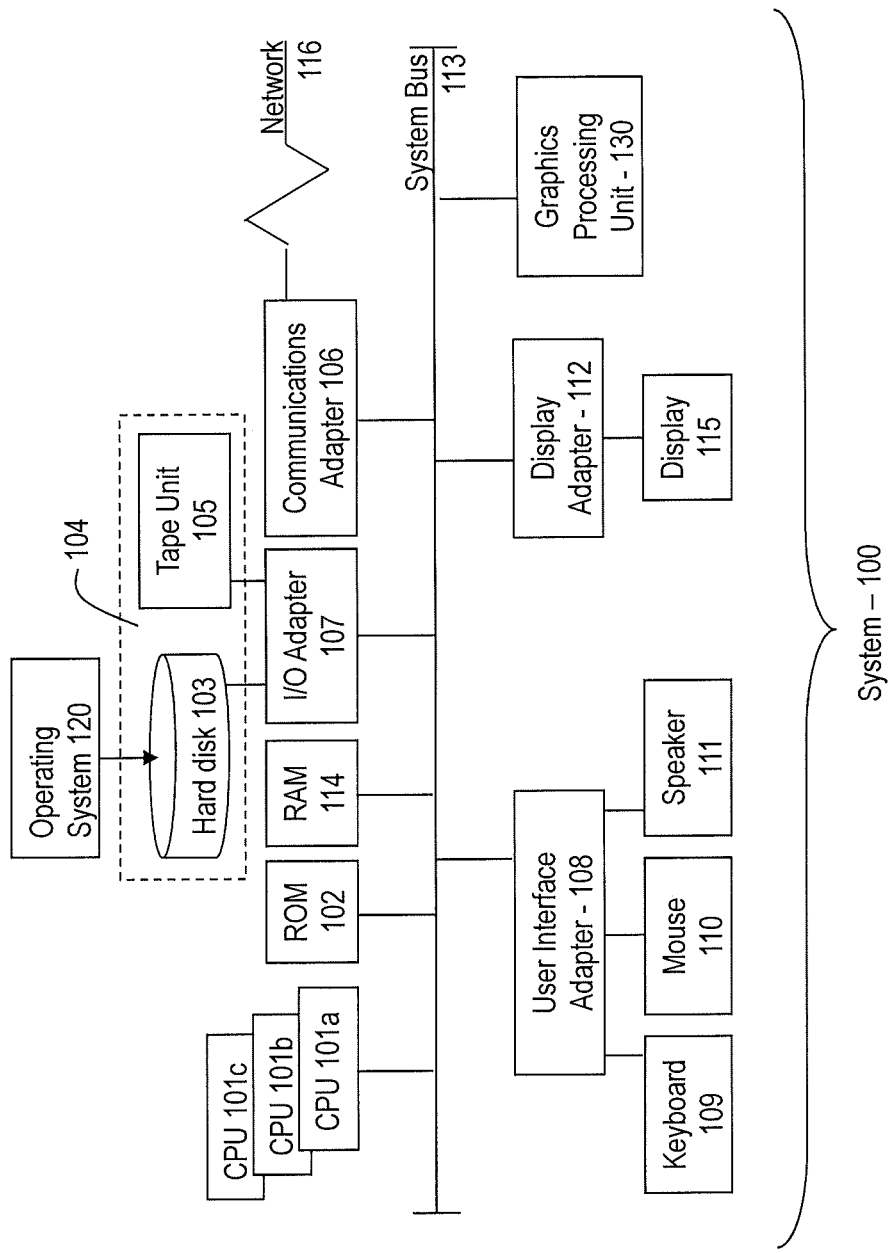
FIG. 3 is a block diagram illustrating one example of a system according to one or more embodiments of the present invention.

FIG. 3 depicts system 100 according to one or more embodiments of the present invention. As depicted, system 100 includes one or more central processing units (processors) 101a, 101b, 101c, etc. (collectively or generically referred to as processor(s) 101). In one embodiment, each processor 101 can include a reduced instruction set computer (RISC) microprocessor. Processors 101 are coupled to system memory (RAM) 114 and various other components via a system bus 113. The system 100 of FIG. 3 can be embodied, for example, as one node of a distributed computing or processing environment such as the cloud computing environment 50 described with reference to FIG. 1. In some embodiments, system memory 114 can store exemplary software modules in accordance with the present invention, for execution on processors 101. For example, (as will be discussed in more detail with reference to FIG. 4 and FIG. 5, such software modules can include a structure match module (240, FIG. 4), distributed memory dataset (DMD) data update module (244, FIG. 4), DMD split module (248, FIG. 4), DMD flush module (252, FIG. 4), and a unified query layer (256, FIG. 4).

Referring again to FIG. 3, system 100 includes a read only memory (ROM) 102, which is coupled to system bus 113 and can include a basic input/output system (BIOS), which controls certain basic functions of system 100.

System 100 further includes an input/output (I/O) adapter 107 and a network adapter 106 coupled to the system bus 113. I/O adapter 107 can be a small computer system interface (SCSI) adapter that communicates with a hard disk 103 and/or tape storage drive 105 or any other similar component. Mass storage 104 devices include (for example and without limitation) hard disk 103 and tape storage device 105. Operating system 120 for execution on processing system 100 can be stored in mass storage 104. A network adapter 106 interconnects bus 113 with an outside network 116 enabling data processing system 100 to communicate with other such systems. A screen (e.g., a display monitor) 115 is connected to system bus 113 by display adapter 112, which can include a graphics adapter to improve the performance of graphics intensive applications and a video controller. In one embodiment, adapters 107, 106, and 112 can be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108. A keyboard 109, mouse 110, and speaker 111 all interconnected to bus 113 via user interface adapter 108, which can include, for example, a super I/O chip, which integrates multiple device adapters into a single integrated circuit.

In exemplary embodiments, the processing system 100 includes a graphics processing unit 130. Graphics processing unit 130 is a specialized electronic circuit designed to manipulate and alter memory to accelerate the creation of images in a frame buffer intended for output to a display. In general, graphics processing unit 130 is very efficient at manipulating computer graphics and image processing, and has a highly parallel structure that makes it more effective than general-purpose CPUs for algorithms where processing of large blocks of data is done in parallel.

Figure 4:
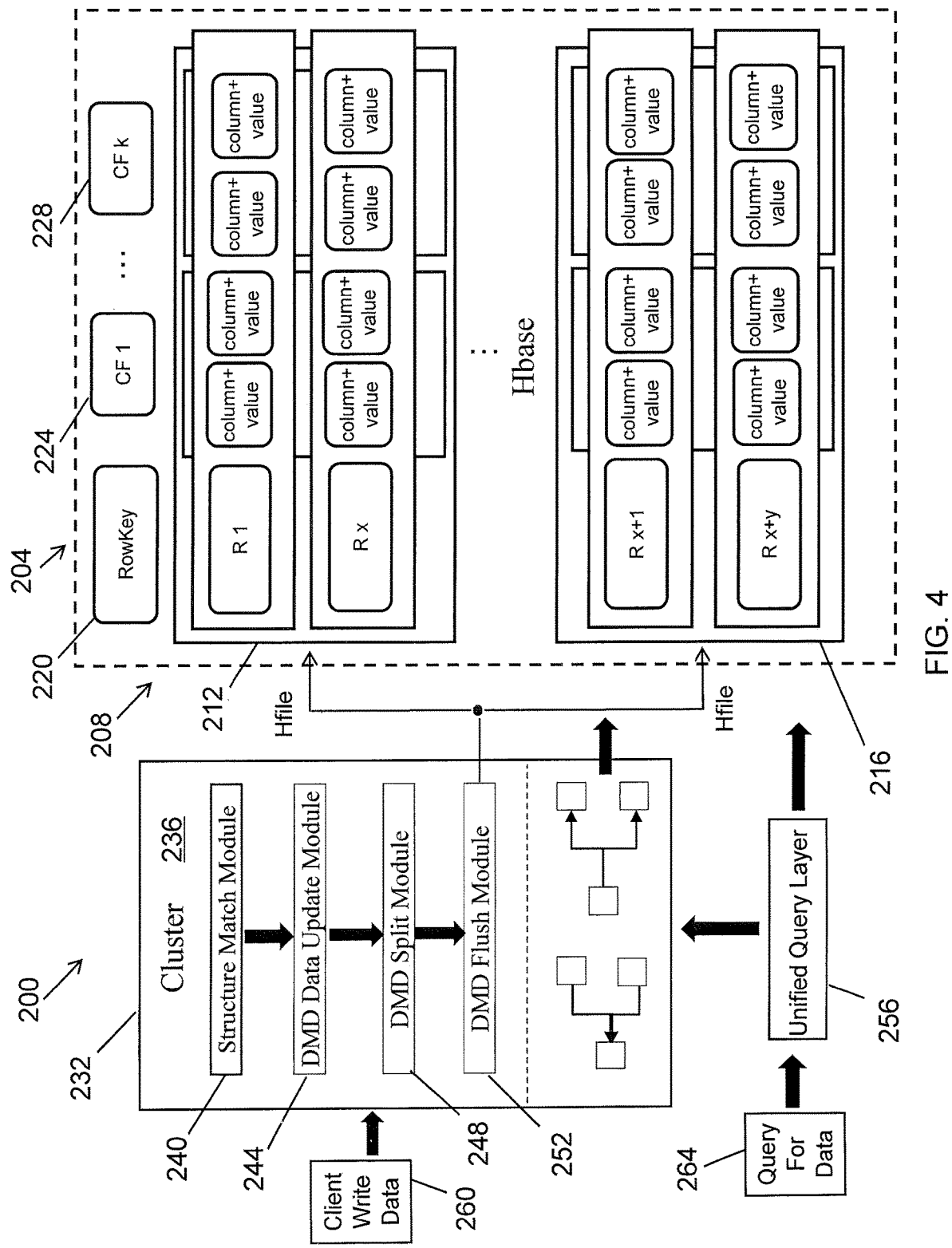
FIG. 4 is a block diagram illustrating one example of a system and database, in accordance with one or more embodiments of the present invention.
Figure 5:
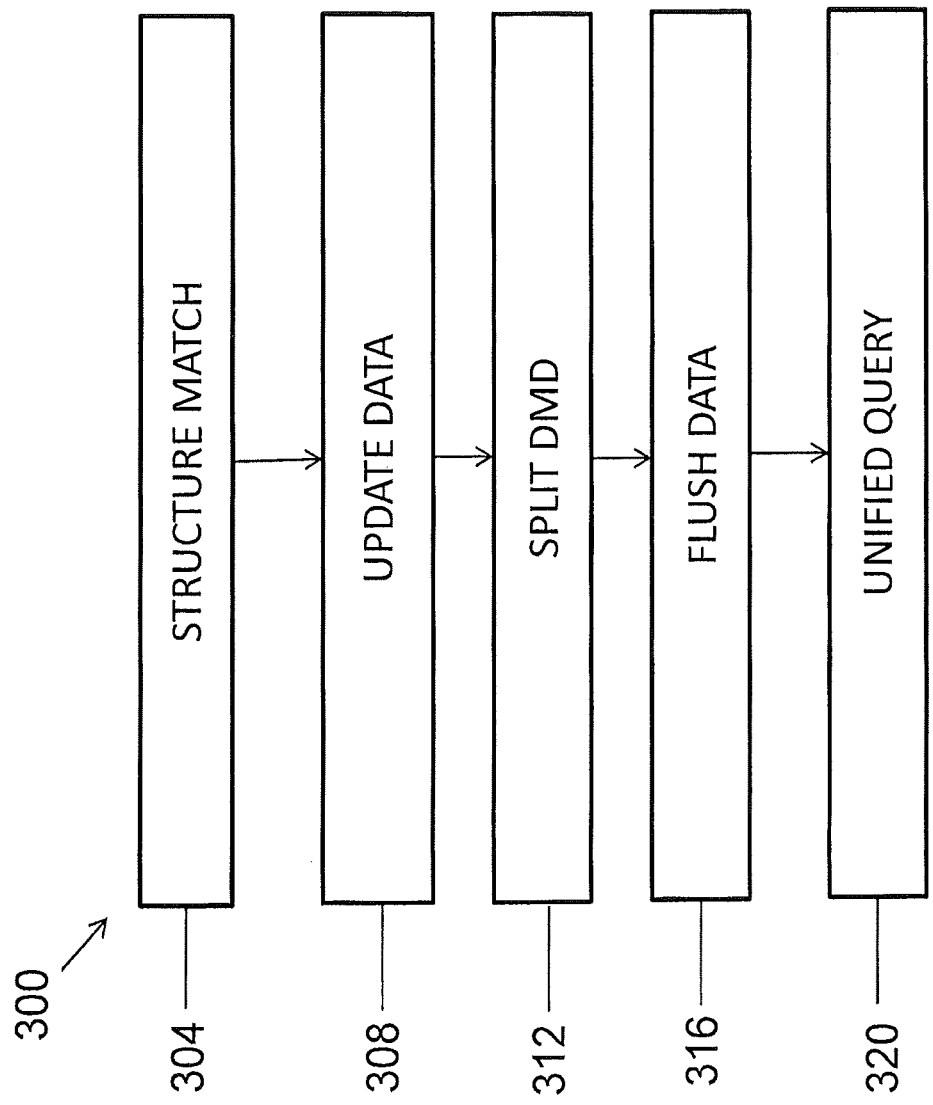
FIG. 5 is a flow diagram of a method for improving the writing of data into a database in accordance with one or more embodiments of the present invention.
Figure 8:
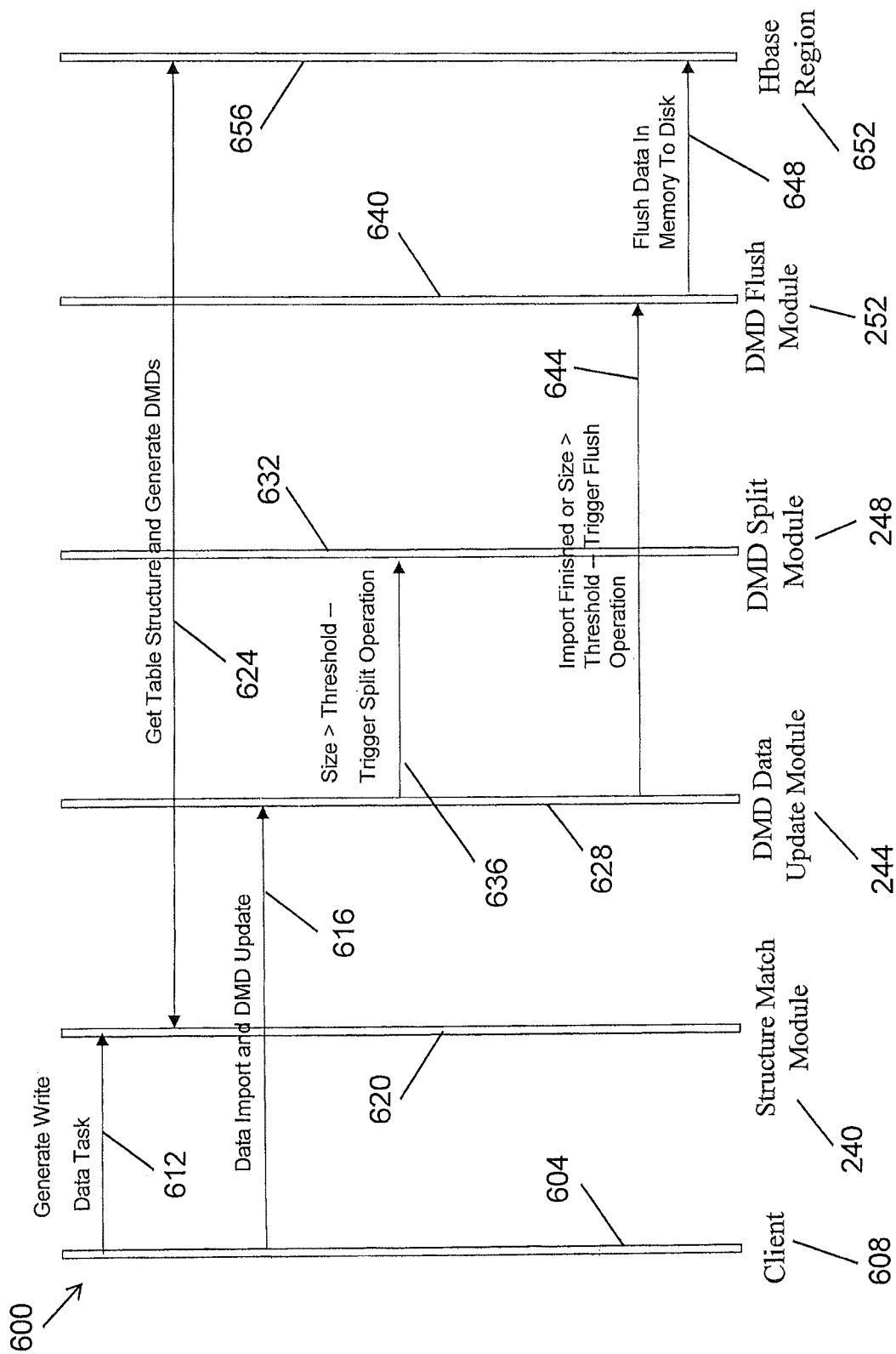
FIG. 8 depicts a sequence diagram further illustrating exemplary method aspects, in accordance with one or more embodiments of the present invention.

Some embodiments of the present invention (examples of which are described in more detail below) improve the writing or import of data into an Hbase database through one or more improved distributed memory dataset management systems, computer-implemented methods and computer program products. For example, FIG. 4 illustrates a system 200 for improving the writing of data into an Hbase database in accordance with one or more embodiments of the present invention. In addition, FIG. 5 and FIG. 8 illustrate exemplary methods for improving the writing of data into an Hbase database in accordance with one or more embodiments of the present invention.

Referring now to FIG. 4, system 200 depicts an exemplary embodiment of a representative (yet relatively small) portion of an Hbase database 204. As depicted, system 200 includes a processor 232 that can be embodied, for example, in a cluster configuration 236 (i.e., a distributed computing or processing environment such as the cloud computing environment 50 described hereinabove and illustrated in FIG. 1). The Hbase database was designed to be implemented and run on a cluster computing configuration. In some embodiments, the cluster configuration 236 of processor 232 can also encompass Hbase database 204. In other embodiments, the processor can encompass one or more of the processors 101 in the system 100 of FIG. 3.

As depicted, system 200 includes exemplary software modules that can implement methods in accordance with the present invention. Briefly, those exemplary software modules include structure match module 240, distributed memory dataset (DMD) data update module 244, DMD split module 248, DMD flush module 252, and unified query layer 256. An exemplary method 300 in accordance with one or more embodiments of the present invention is illustrated and will be described in more detail with reference to FIG. 5.

Referring again to FIG. 4, system 200 includes Hbase 204, which further includes at least one table 208 having two Hfiles 212, 216. However, this is purely exemplary. An Hbase 204 typically contains many ("sets" of) tables 208, and each table 208 typically contains a large number of Hfiles 212, 216. Each table 208 in an Hbase 204 has a RowKey 220, which as described hereinabove, can be used as a primary key element for data access operations (e.g., write and read) regarding a particular table 208 of interest within Hbase 204. These data access operations are typically carried out by a user or client device (e.g., a processor or other data processing device). Hfiles 212, 216 have a number of rows with RowKeys labeled or named contiguously as "R1," Rx," "Rx+1'" and "Rx+y." This allows for tables within the Hbase 204 to be divided into sequences of rows (sometimes referred to herein as "regions"), which can be assigned to individual nodes in a cluster computing configuration, the nodes being commonly referred to as RegionsServers. Each Region can be defined or bounded by a start RowKey and an end RowKey (not depicted).

The Hbase database 204 of FIG. 4 also includes a number of column families 224, 228 per Hfile 212, 216. FIG. 4 shows two column families 224, 228 per Hfile 212, 216, with each of the two column families being named or labeled "CF 1" and "CF k," where "k" represents some number greater than "1." However, this is for illustrative purposes only—there can be any number of column families per Hfile. Basically, a plurality of column families group relatively similar data together, and the RowKey is the primary index into the column families. This type of data structure is advantageous when implementing and running an Hbase database in a cluster computing configuration. That is, data that is accessed together is stored together.

Also, FIG. 4 shows that each column family 224, 228 contains two columns of attribute data arranged in individual cells. However, there can be any number of columns per column family. The data in each cell is labeled or named in FIG. 4 as "column+value." That is, each column in a column family is given a name. The cell data can include, for example, metadata such as time stamp information and/or other types of structural information relating to the column that the cell resides in. The contents of an entire cell are typically referred to as the "Key Value" of the cell.

FIG. 4 also shows a client write data function 260 which is the process by which a client or user begins the writing or importing of data into the Hbase 204. Also depicted in FIG. 4 is a query for data function 264 initiated by a client or user, as explained in more detail hereinafter with respect to the unified query operation 320 of FIG. 5 and the unified query layer 256 of FIG. 4.

FIG. 5 illustrates an exemplary method 300 according to one or more embodiments of the present invention. In some embodiments of the present invention, method 300 is computer-implemented e.g., in software (also referred to herein as programs, applications or program instructions) that can be executed by computer elements located within a network (cluster) that can reside in a cloud, such as the cloud computing environment 50 described hereinabove and illustrated in FIGS. 1 and 2. In other embodiments, the computer elements can reside on a computer system or processing system, such as the processing system 100 described hereinabove and illustrated in FIG. 3, or in some other type of computing or processing environment now known or hereinafter created.

Although, it is common to write Hbase software programs or applications in the JAVA® software programming language, embodiments of the present invention are not limited as such. Rather, any suitable software programming language can be used to embody the method 300 of the software of embodiments of the present invention. These programming languages can include, for example and without limitation, the Avro, REST or Thrift languages.

Some embodiments of the present invention can include a number of shell commands available to a client or user device. The shell commands can be implemented in an Application Program Interface (API) software program written in, e.g., the JAVA® software programming language or any of the aforementioned software programming languages.

Referring now to FIG. 5, in block 304 the various DMDs utilized by the method 300 are generated. In some embodiments, "structure match" can include or correspond to the structure match module 240 of FIG. 4 and the DMD generation is based on the table structure of the Hbase database 204. That is, the DMDs are generated across the Hbase 204 based on the table structure within the Hbase 204. Every DMD represents an Hfile or Region within the Hbase 204. Also the operation in block 304 can be in response to an initiation of a data write or import request into the Hbase 204 by the client or user (260, FIG. 4). Thus, this operation 304 can be considered to be a type of "pre-processing" operation, which can be optional and not needed if an adequate number of DMDs already exist in the Hbase 204.

An operation in block 308 includes or corresponds to the DMD data update module 244 of FIG. 4. In this operation 308, a corresponding one of the DMDs has its data contents updated (i.e., rewritten with new data). This is done in response to a client writing or importing data into the Hbase 204 (260, FIG. 4). Specific to this operation 308 is that when the client writes or imports new data into the Hbase 204, the new data will be divided into or among different DMDs, based on the Key Value data stored in the cells. This improves the throughput of the overall data write process.

Figure 6:
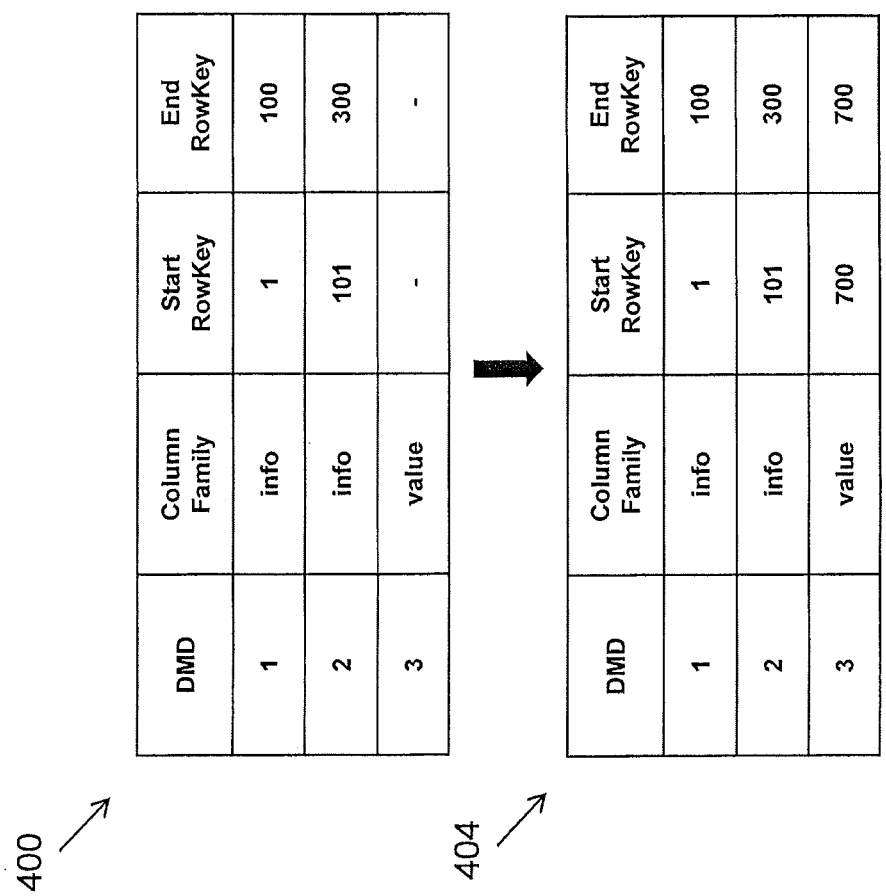
FIG. 6 illustrates a portion of a table in an Hbase database both before and after a data update operation in accordance with one or more embodiments of the present invention.

For example, FIG. 6 illustrates a portion of a table 400, 404 in the Hbase database 204 both before and after the data update operation 308 in accordance with one or more embodiments of the present invention. The "before" table 400 contains two DMDs which currently contain data (i.e., DMD 1 and DMD 2). The existing data relates to the "info" column family. The data in DMD 1 is in a Region in the Hbase 204 bounded by the start RowKey value of 1 and by the end RowKey value of 100. Similarly, the data in DMD 2 is in a Region in the Hbase 204 bounded by the start RowKey value of 101 and by the end RowKey value of 300. The data can be portioned or divided as between DMD 1 and DMD 2 based on the Key Value of the cells. Also, in the "before" table 400, DMD 3 contains no data.

Now, with respect to the "after" table 404 of FIG. 6, the client has written or imported ("updated") data to a column family labeled "value." In accordance with embodiments of the present invention, the imported or updated data is stored in DMD 3, with both a start RowKey value of 700 and an end RowKey value of 700. That is, only one cell has this updated data stored in it.

An operation in block 312 includes or corresponds to the DMD data split module 248 of FIG. 4. In this operation 312, as the data update operation in block 308 writes data into the DMDs, the size or amount of the data in each DMD is checked and if the amount of the data in a DMD exceeds a predetermined threshold, then the data split operation 312 occurs. In this operation 312, the DMD having the data that exceeds the threshold is split into two DMDs. This split operation can be performed in accordance with embodiments of the present invention by obtaining the middle value of the RowKey in the Regions or range of RowKeys between the start RowKey and the end RowKey. The original DMD is then split into two DMDs based on this middle value of RowKey (i.e., the division point). This middle value is typically not the mean value.

Figure 7:
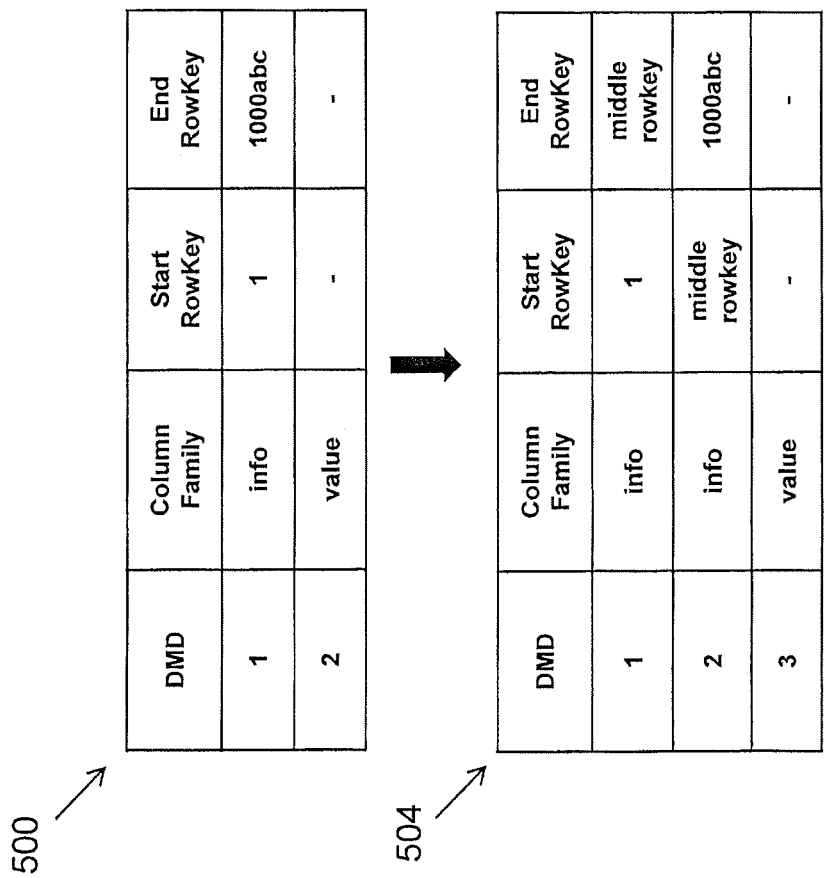
FIG. 7 illustrates a portion of a table in an Hbase database both before and after a distributed memory dataset split operation in accordance with one or more embodiments of the present invention.

For example, FIG. 7 illustrates a portion of a table 500, 504 in the Hbase database 204 both before and after the distributed memory dataset (DMD) split operation 312 in accordance with one or more embodiments of the present invention. The "before" table 500 contains one DMD which currently contains data (i.e., DMD 1). A second DMD (DMD 2) can either currently contain data or cannot currently contain data. The existing data in DMD 1 relates to the "info" column family. The data in DMD 1 is in a Region in the Hbase 204 bounded by the start RowKey value of 1 and by the end RowKey value of 1000abc.

Now, with respect to the "after" table 504 of FIG. 7, after the data split operation 312, the end RowKey of DMD 1 is the value of the middle RowKey. Further, DMD 2 now contains data that corresponds to a start RowKey that equals the middle RowKey, and with an end RowKey of 1000abc.

An operation in block 316 can include or corresponds to the DMD data flush module 252 of FIG. 4. In block 316, the data written into the Hbase 204 by the client and that is typically stored initially in the MemStore buffer or cache is written, moved or "flushed" out into disk storage (i.e., a "StoreFile" Region) to form an Hfile. In accordance with embodiments of the present invention, this data flush operation 316 can be performed upon the occurrence of either of two events: when the client has finished importing or writing data into the Hbase 204; or if the size or amount of data in any one DMD exceeds a predetermined threshold (e.g., 1.5 times the Region size).

For the former condition, the data in the DMDs is recombined as evenly as possible based on, e.g., the continuity of the data, to reduce the number of Regions in the Hbase 204. The data can be written to the Regions according to the performance characteristics of the Regions Servers. The Regions Servers are typically separate data nodes in the computing configuration cluster. For the latter condition, (similar to the former condition), the data in the DMDs is recombined as evenly as possible based on, e.g., the continuity of the data, to reduce the number of Regions in the Hbase 204. The data can be written to the Regions according to the performance characteristics of the Regions Servers.

Block 320, which can include or correspond to the unified query layer 256 of FIG. 4, can be activated when a client or user initiates a query operation (264, FIG. 4) of the Hbase 204—typically, to find or locate certain information or data stored in the Hbase 204. Sometimes when a client initiates a query for data, there will be some data in the DMDs, but the data is not yet in the Hbase 204. In accordance with some embodiments of the present invention, this situation can be resolved by creating a middle layer (e.g., the unified query layer 256, FIG. 4) to thereby transfer the query request to the Hbase 204 and to the DMDs. The response from then Hbase 204 and the DMDs is then merged to form the response to the query.

FIG. 8 depicts a sequence diagram 600 further illustrating aspects of the present invention. More specifically, according to embodiments of the present invention, the sequence diagram 600 of FIG. 8 depicts the operation of the system 200 of FIG. 4 and the method 300 in the flow diagram of FIG. 5—in particular, the performance of certain operations at certain periods of time over a time period.

At a first sequence in time 604, a client 608 initiates the data write or import task 612 (e.g., by indicting or generating its desire to write data into the Hbase 204). As a result, data is imported into the Hbase 204 and the updating of the DMDs starts to occur in operation 616.

At a second sequence in time 620, the structure match module 240 (FIG. 4) obtains the table structure of the Hbase 204 and starts to generate the DMDs in an operation 624. At a third sequence in time 628, the DMD data update module 244 has concluded its updating of any one or more of the DMDs that required its data to be updated on account of the client writing or importing new data into the DMDs.

At a fourth sequence in time 632, the DMD split module 248 operates to determine if the size or amount of the data in a DMD exceeds a predetermined threshold. If so, the DMD having the data that exceeds the threshold is split into two DMDs in an operation 636.

At a fifth sequence in time 640, the DMD flush module 252 operates to determine if the client has finished importing or writing data into the Hbase 204, or if the size or amount of data in any one DMD exceeds a predetermined threshold, in an operation 644. If either condition occurs, then the data written into the Hbase 204 by the client, which is typically stored initially in the MemStore buffer or cache, is moved or "flushed" out into disk storage (i.e., a "StoreFile" Region) in an operation 648 to form an Hfile in an Hbase Region 652. This is completed at the sixth sequence of time 656.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

As used herein, the articles "a" and "an" preceding an element or component are intended to be nonrestrictive regarding the number of instances (i.e., occurrences) of the element or component. Therefore, "a" or "an" should be read to include one or at least one, and the singular word form of the element or component also includes the plural unless the number is obviously meant to be singular.

As used herein, the terms "invention" or "present invention" are non-limiting terms and not intended to refer to any single aspect of the particular invention but encompass all possible aspects as described in the specification and the claims.

As used herein, the term "about" modifying the quantity of an ingredient, component, or reactant of the invention employed refers to variation in the numerical quantity that can occur, for example, through typical measuring and liquid handling procedures used for making concentrates or solutions. Furthermore, variation can occur from inadvertent error in measuring procedures, differences in the manufacture, source, or purity of the ingredients employed to make the compositions or carry out the methods, and the like. In one aspect, the term "about" means within 10% of the reported numerical value. In another aspect, the term "about" means within 5% of the reported numerical value. Yet, in another aspect, the term "about" means within 10, 9, 8, 7, 6, 5, 4, 3, 2, or 1% of the reported numerical value.

The descriptions of the various embodiments of the present invention have been presented for purposes of illustration, but are not intended to be exhaustive or limited to the embodiments described. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
   updating, by a processor, one or more distributed memory datasets having data stored therein in response to a write data operation, the one or more distributed data memory datasets being located in a database;
   splitting, by the processor, any one of the one or more distributed memory datasets into two distributed memory datasets when a size of the any one of the one or more distributed memory datasets exceeds a threshold value, wherein the one or more distributed memory datasets includes a first distributed memory dataset; and
   moving, by the processor, the stored data in any one of the one or more distributed memory datasets to regions within the database upon an occurrence of one or more conditions with respect to the one or more distributed memory datasets, wherein the moving occurs when the write data operation has completed;
   wherein the splitting includes:
   obtaining, by the processor, a middle value of a RowKey of the first distributed memory dataset of a range of RowKeys between a start RowKey of the first distributed memory dataset and an end RowKey of the first distributed memory dataset; and
   dividing, by the processor, the first distributed memory dataset into a second and third distributed memory dataset based on the obtained middle value of the RowKey when the size of the first distributed memory dataset exceeds the threshold value, wherein the obtained middle value is the division point of the dividing, wherein the second distributed memory dataset is bounded by the start RowKey and the middle value, wherein the third distributed memory dataset is bounded by the middle value and the end RowKey; and
   responding, by the processor, to a query for data by creating a middle layer to transfer the query to the database and the distributed memory datasets and by merging a response from the database and the distributed memory datasets, in response to the query.

2. The computer-implemented method of claim 1, further comprising generating, by the processor, the one or more distributed memory datasets in an Hbase database based on a structure of tables within the Hbase database.

3. The computer-implemented method of claim 1, wherein moving, by the processor, the stored data in any one of the one or more distributed memory datasets to regions within the database occurs when an amount of data in any one of the one or more distributed memory datasets exceeds a predetermined threshold.

4. The computer-implemented method of claim 1, wherein the processor is located in a cloud computing environment, and wherein the method is implemented in software run by the processor located in the cloud computing environment.

5. A computer system comprising:
   one or more types of memory having program instructions stored thereon;
   a processor in communication with the one or more types of memory, the program instructions when executed by the processor, causing the system to:
   update one or more distributed memory datasets having data stored therein in response to a write data operation, the one or more distributed data memory datasets being located in a database, wherein the one or more distributed memory datasets includes a first distributed memory dataset;
   split any one of the one or more distributed memory datasets into two distributed memory datasets when a size of the any one of the one or more distributed memory datasets exceeds a threshold value; and
   move the stored data in any one of the one or more distributed memory datasets to regions within the database upon an occurrence of one or more conditions with respect to the one or more distributed memory datasets, wherein the moving occurs when the write data operation has completed;
   wherein the splitting includes causing the system to:
   obtain a middle value of a RowKey of the first distributed memory dataset of a range of RowKeys between a start RowKey of the first distributed memory dataset and an end RowKey of the first distributed memory dataset; and
   divide the any one of the first distributed memory dataset into a second and third distributed memory dataset based on the obtained middle value of the RowKey when the size of the first distributed memory dataset exceeds the threshold value, wherein the obtained middle value is the division point of the dividing, wherein the second distributed memory dataset is bounded by the start RowKey and the middle value, wherein the second distributed memory dataset is bounded by the middle value and the end RowKey; and respond to a query for data by creating a middle layer to transfer the query to the database and the distributed memory datasets and by merging a response from the database and the distributed memory datasets, in response to the query.

6. The computer system of claim 5, wherein the program instructions when executed by the processor, further causing the system to generate the one or more distributed memory datasets in an Hbase database based on a structure of tables within the Hbase database.

7. The computer system of claim 5, wherein the program instructions when executed by the processor, causing the system to move the stored data in any one of the one or more distributed memory datasets to regions within the database when an amount of data in any one of the one or more distributed memory datasets exceeds a predetermined threshold.

8. The computer system of claim 5, wherein the processor is located in a cloud computing environment, and wherein the program instructions are implemented in software run by the processor located in the cloud computing environment.

9. A computer program product for performing a method, the computer program product comprising a computer readable storage medium having program instructions embodied therewith, the program instructions executable by a processor to cause the processor to:

update one or more distributed memory datasets having data stored therein in response to a write data operation, the one or more distributed data memory datasets being located in a database, wherein the one or more distributed memory datasets includes a first distributed memory dataset;

split any one of the one or more distributed memory datasets into two distributed memory datasets when a size of the any one of the one or more distributed memory datasets exceeds a threshold value; and move the stored data in any one of the one or more distributed memory datasets to regions within the database upon an occurrence of one or more conditions with respect to the one or more distributed memory datasets, wherein the moving occurs when the write data operation has completed;

wherein the splitting includes causing the system to:

obtain a middle value of a RowKey of the first distributed memory dataset of a range of RowKeys between a start RowKey of the first distributed memory dataset and an end RowKey of the first distributed memory dataset; and divide the any one of the first distributed memory dataset into a second and third distributed memory dataset based on the obtained middle value of the RowKey when the size of the first distributed memory dataset exceeds the threshold value, wherein the obtained middle value is the division point of the dividing, wherein the second distributed memory dataset is bounded by the start RowKey and the middle value, wherein the second distributed memory dataset is bounded by the middle value and the end RowKey; and respond to a query for data by creating a middle layer to transfer the query to the database and the distributed memory datasets and by merging a response from the database and the distributed memory datasets, in response to the query.

10. The computer program product of claim 9, the program instructions executable by a processor further cause the processor to generate the one or more distributed memory datasets in an Hbase database based on a structure of tables within the Hbase database.

11. The computer program product of claim 9, wherein the program instructions executable by a processor cause the processor to move the stored data in any one of the one or more distributed memory datasets to regions within a database when an amount of data in any one of the one or more distributed memory datasets exceeds a predetermined threshold.

12. The computer program product of claim 9, wherein the processor is located in a cloud computing environment, and wherein the program instructions are implemented in software run by the processor located in the cloud computing environment.

* * * * *